United States Patent [19]

Camin

[11] 4,198,766
[45] Apr. 22, 1980

[54] INTRAVENOUS TRAINING/DEMONSTRATION AID

[75] Inventor: Lawrence R. Camin, Dallas, Tex.

[73] Assignee: Baxter Travenol Laboratories, Inc., Deerfield, Ill.

[21] Appl. No.: 917,523

[22] Filed: Jun. 21, 1978

[51] Int. Cl.² .............................................. G09B 23/28
[52] U.S. Cl. ........................................................ 35/17
[58] Field of Search ....................................... 35/17, 51

[56] References Cited

U.S. PATENT DOCUMENTS

| | | | |
|---|---|---|---|
| 2,686,374 | 8/1954 | Niiranen | 35/17 |
| 2,689,415 | 9/1954 | Haver | 35/17 |
| 2,704,897 | 3/1955 | Lade | 35/17 |
| 2,871,584 | 2/1959 | Poole | 35/17 |
| 2,995,832 | 8/1961 | Alderson | 35/17 |
| 3,226,846 | 1/1966 | Wood | 35/17 |
| 3,376,659 | 4/1968 | Asin | 35/17 |
| 3,579,858 | 5/1971 | Bentov | 35/17 |
| 3,766,666 | 10/1973 | Stroop | 35/17 |
| 3,789,518 | 2/1974 | Chase | 35/17 |

*Primary Examiner*—Harland S. Skogquist
*Attorney, Agent, or Firm*—Richards, Harris & Medlock

[57] ABSTRACT

A novel training aid for instructing medical personnel in proper intravenous techniques comprises a base having a vein-simulating tube removably seated in each of the one or more curved recesses formed in the top surface of the base. The vein-simulating tubes, and preferably the base as well, are formed of substantially transparent materials allowing the trainee to observe the interaction of an intravenous device with the walls of the vein-simulating tubes. The invention is also used to instruct appropriate techniques for taping the intravenous device to the patient and to demonstrate how the external portion of the device will contact the patient's skin.

11 Claims, 3 Drawing Figures

INTRAVENOUS TRAINING/DEMONSTRATION AID

BACKGROUND AMD SUMMARY OF THE INVENTION

The present invention relates generally to a training and demonstration aid. More particularly, the present invention concerns an improved training aid for demonstrating products or instructing proper intravenous techniques to medical personnel.

Traditionally, some form of artificial training aid is utilized to provide basic instruction in intravenous or venipuncture techniques before practice with a live patient. The prior art includes several examples of so called 'training arms'. The prior approaches to instruction in the placement of intravenous devices, such as needles, catheters and the like, have focused on the difficulties of locating a suitable blood vessel and then piercing the vessel. For this reason, such training arms include some type of skin elememt to cover the simulated blood vessels, just as real veins and arteries are concealed within a live patient. Some of the prior art training arms are constructed to simulate the roll of a natural blood vessel. Still other training arms of the prior art are directed to the aspects of realistic appearance, color, texture and feel. Many of the prior art training arms are relatively complicated and therefore expensive.

However, there is a further aspect to proper intravenous technique which the training aids heretofore completely fail to teach. Aside from locating and piercing a suitable blood vessel, it is also essential that the tip of the intravenous device be properly positioned with respect to the walls of the blood vessel. This is important for both patient comfort and success of the intravenous procedure. The training aids of the prior art do not permit a trainee to observe the interaction of the intravenous device with the walls of the blood vessel, leaving instruction on the proper placement of the device to be learned by practice or trial and error with a live patient. There is thus a need for an improved training aid for instructing a trainee in the proper placement of an intravenous device following location and puncture of a blood vessel. There is also a need to demonstrate the differences among intravenous placement units (sizes, lengths and materials) and their relationship to the wall of the blood vessel.

The present invention comprises a novel intravenous training aid which overcomes the foregoing and other difficulties associated with the prior art. In accordance with the broad aspects of the invention, there is provided an artificial training aid for demonstrating and instructing the interaction between a blood vessel and a needle, catheter or the like. Use of the invention enables direct observation of the exact relationship between the blood vessel and the intravenous device. The training aid of the invention is inexpensive, uncomplicated, easily fabricated and highly portable. The invention can also be used to demonstrate the various intravenous placement units available, as well as proper taping techniques.

In accordance with more specific aspects of the invention, there is provided as improved intravenous training aid comprising a base having top and bottom surfaces, and which is preferably substantially transparent. The top surface of the base includes a plurality of curved recesses therein having predetermined widths and depths. A substantially transparent blood vessel simulating tube is removably seated in each of the recesses in the top surface of the base. Viewing the invention from the bottom side allows observation of the relationship of the external portion of the intravenous placement unit to the surface of the base or skin. By means of the invention, a trainee can visibly observe the exact interaction between an intravenous device and the simulated blood vessel and further develop manual dexterity before practice with a live patient.

DESCRIPTION OF THE DRAWINGS

A more complete understanding of the invention can be had by reference to the following Detailed Description in conjunction with the accompanying Drawings, wherein.

DETAILED DESCRIPTION

Figure 1:
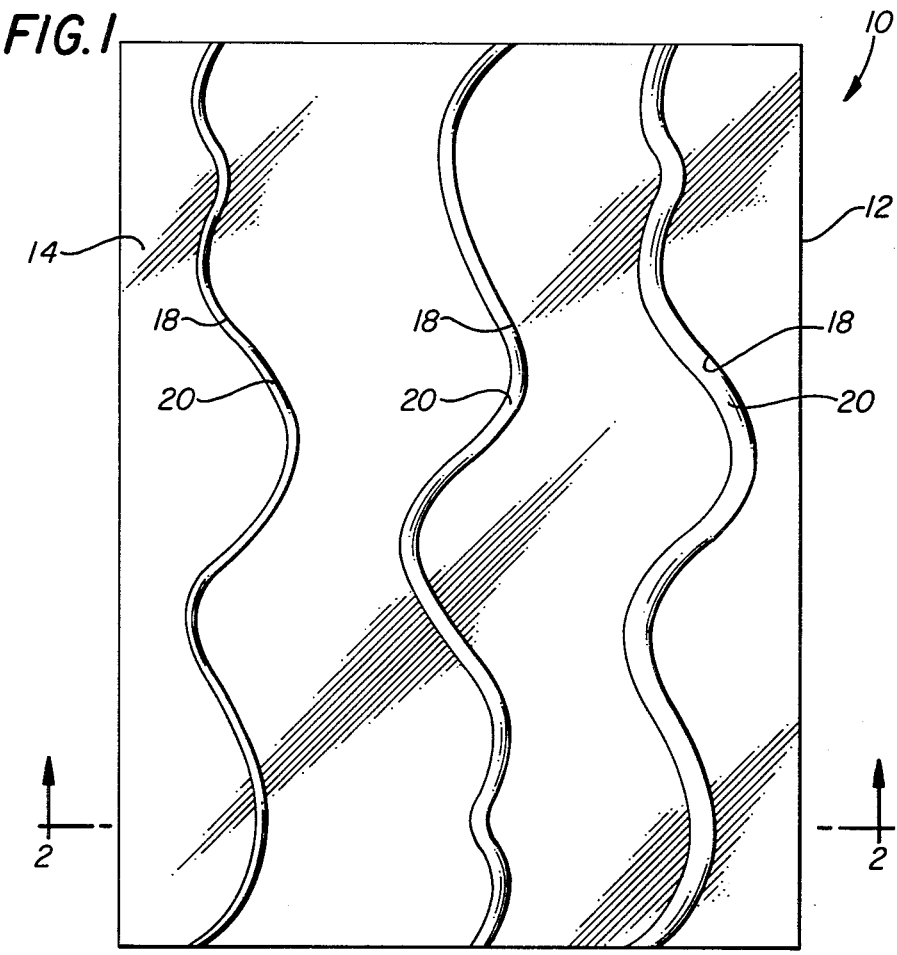
FIG. 1. is a plan view of an apparatus incorporating the invention.

Referring now to the Drawings, wherein like reference numerals designate like or corresponding parts throughout the views, there is shown an improved intravenous training device 10 incorporating the invention. Use of device 10 permits a trainee to observe the exact interaction between a simulated blood vessel and an intravenous device such as a needle catheter or the like. Use of the training device 10 thus permits refinement of intravenous techniques before practice with a live patient.

Figure 2:
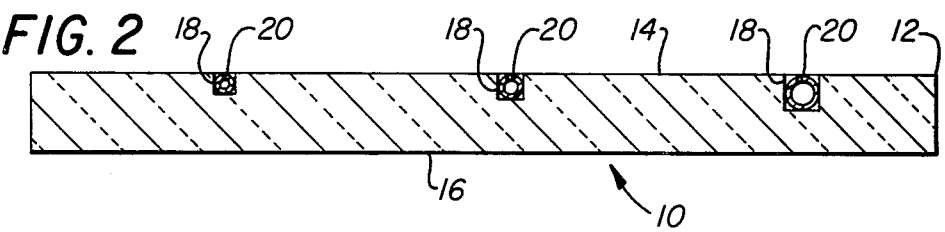
FIG. 2 is an enlarged sectional view taken along lines 2—2 of FIG. 1 in the direction of the arrows.

FIGS. 1 and 2 illustrate the constructional details of the invention. The training device 10 includes a substrate or base 12 having a top surface 14 and a bottom surface 16. For purposes of illustration, base 12 is shown in a rectangular form, however it will be understood that any suitable form can be used. Preferably, bottom surface 16 of the base 12 is substantially flat and adapted to be supported on a horizontal surface. The top surface 14 of the base 12 is also substantially flat in the preferred embodiment of the invention. The base 12 can be formed of any suitable substrate material, such as plastic, or the synthetic resin material sold under the trademark PLEXIGLAS. Preferably, a substantially transparent material is utilized to form base 12.

The top surface 14 of base 12 includes grooves or recesses 18 formed therein. As is best shown in FIG. 1, each recess 18 curves or undulates along top surface 14 of substrate 12 in a fashion representing actual blood vessels. At least one recess 18 is required, although for purposes of illustration three recesses 18 are shown. When utilizing a plurality of recesses 18, each recess is preferably of a different size. It will thus be understood that one or more undulating or wavy recesses 18 of predetermined sizes are formed in the top surface 14 of base 12.

As is best shown in FIG. 2, a tube 20 is seated in each recess 18. The blood vessel simulating tubes 20 are formed of a soft and substantially transparent plastic material. Clear vinyl tubing has been found suitable for use as tubes 20. Recesses 18 receive tubes 20 in substantially flush relationship with the top surface 4 of base 12. It will be apparent that tubes 20 are easily and quickly replaceable. If desired, fluid can be pumped through tubes 20 by conventional means (not shown) to simulate blood flow.

Figure 3:
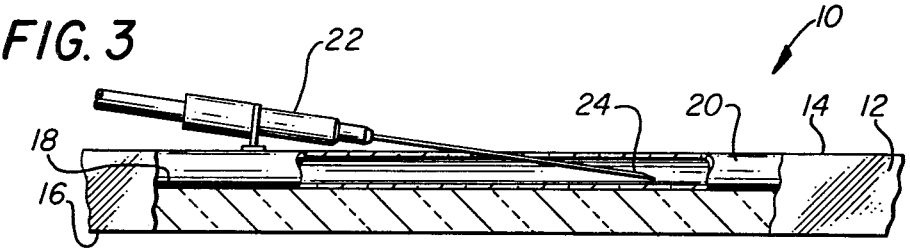
FIG. 3 is an illustration in which certain parts have been broken away to better illustrate use of the invention with an intravenous device.

FIG. 3 illustrates the use of an intravenous unit 22 with the invention. The intravenous unit 22 can comprise a catheter, needle or the like. As the intravenous unit 22 is inserted into a blood vessel-simulating tube 20, the trainee can visually observe the relative positions between needle 24 and the walls of the tube. The different sizes and curvature of the tubes 20 enable a variety of techniques to be practiced or demonstrated. After insertion, a trainee can also practice taping the unit 22 in place so that the tip of needle 24 does not contact the walls of tube 20, which contact would cause discomfort to a live patient. A trainee can thus observe exactly how placement of intravenous unit 22 affects the vein wall, as well as its potential occlusive action on blood flow.

From the foregoing, it will be understood that the present invention comprises an improved training aid for instructing trainees in the proper placement of an intravenous unit after the location and puncture of an appropriate blood vessel. The invention is of economical construction and permits a trainee to visually observe the exact interaction between the intravenous unit and the simulated blood vessel.

Although preferred embodiments of the invention have been illustrated in the accompanying Drawings and described in the foregoing Detailed Description, it will be understood that the application is not limited to the embodiments disclosed, but is intended to embrace any alternatives, modifications, rearrangements and substitutions of parts and/or elements falling within the spirit and scope of the invention.

What is claimed is:

1. An intravenous training/demonstration aid, comprising:
   a rigid base having a top surface and a bottom surface, said top surface having at least one undulating groove therein; and
   a flexible blood vessel-simulating tube of substantially transparent construction removably seated in each undulating groove in said base to permit observation by a trainee of the interaction between an intravenous device and the walls of said tube.

2. The training aid of claim 1 wherein the base is formed of substantially transparent material.

3. The training aid of claim 1 wherein the top surface of the base adjacent each groove therein is substantially flat.

4. The training aid of claim 1 wherein the bottom surface of the base is substantially flat.

5. The training aid of claim 1 wherein the top surface adjacent each groove therein and the bottom surface of the base are both substantially flat.

6. The training aid of claim 1 wherein each blood vessel-simulating tube is formed of clear plastic material.

7. The training aid of claim 1 wherein a plurality of undulating grooves are provided in said base, and each of the blood vessel-simulating tubes seated in said grooves is of a different diameter.

8. An intravenous training/demonstration aid, comprising:
   a rigid base having a top surface, said base being formed of a substantially transparent material and having a plurality of grooves of curved configurations formed in the top surface in mutually spaced-apart relationship; and
   a plurality of flexible blood vessel-simulating tubes one being removably seated in each curved groove in said base, said tubes being constructed of substantially transparent material permitting a trainee to visibly observe the interaction between the walls of said tubes and an intravenous device.

9. The training/demonstration aid of claim 8, wherein the top surface of the base adjacent each groove therein is substantially flat.

10. The training/demonstration aid of claim 8, wherein the blood vessel-simulating tubes seated in said grooves are of different diametric sizes.

11. Apparatus for training or demonstrating placement of an intravenous unit, which comprises:
    a base with top and bottom surfaces;
    said base being formed of substantially transparent material;
    the top surface of said base being substantially flat and having a plurality of undulating grooves formed therein in mutually spaced-apart relationship; and
    a plurality of flexible blood vessel-simulating tubes of different diametric sizes and formed of substantially transparent material, one of said tubes being removably seated in each of said grooves.

* * * * *